(12) United States Patent
Kang

(10) Patent No.: US 9,772,130 B2
(45) Date of Patent: Sep. 26, 2017

(54) REFRIGERATOR AND METHOD FOR CONTROLLING A REFRIGERATOR

(71) Applicant: LG ELECTRONICS INC., Seoul (KR)

(72) Inventor: Sunghee Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 14/574,062

(22) Filed: Dec. 17, 2014

(65) Prior Publication Data

US 2015/0168040 A1 Jun. 18, 2015

(30) Foreign Application Priority Data

Dec. 17, 2013 (KR) .................. 10-2013-0157646

(51) Int. Cl.
*F25B 49/02* (2006.01)
*F25B 5/04* (2006.01)
*F25D 17/06* (2006.01)

(52) U.S. Cl.
CPC ............. *F25B 49/02* (2013.01); *F25B 5/04* (2013.01); *F25D 17/065* (2013.01); *F25B 2400/0409* (2013.01); *F25B 2400/0411* (2013.01); *F25B 2600/0251* (2013.01); *F25B 2600/112* (2013.01); *F25B 2600/2511* (2013.01); *F25B 2700/173* (2013.01); *F25B 2700/2104* (2013.01); *Y02B 30/743* (2013.01)

(58) Field of Classification Search
CPC .... F25B 49/02; F25B 5/04; F25B 2400/0409; F25B 2400/0411; F25B 2600/0251; F25B 2600/112; F25B 2700/2104; F25D 17/065; F25D 2600/04
See application file for complete search history.

(56) References Cited

U.S. PATENT DOCUMENTS

| 6,058,723 | A | * | 5/2000 | Kusunoki | F25D 17/065 62/155 |
|---|---|---|---|---|---|
| 2005/0172665 | A1 | * | 8/2005 | Kim | F25B 5/04 62/525 |
| 2007/0227166 | A1 | * | 10/2007 | Rafalovich | F25D 29/00 62/199 |
| 2013/0061620 | A1 | * | 3/2013 | Li | F25B 5/02 62/126 |

* cited by examiner

*Primary Examiner* — Marc Norman
(74) *Attorney, Agent, or Firm* — KED & Associates LLP

(57) ABSTRACT

A refrigerator and a method for controlling a refrigerator are provided. The refrigerator may include a pair of evaporators. When a switching valve operates, one blower fan may be maintained in operation for a predetermined period of time to more quickly collect a refrigerant, thereby realizing an efficient cycle operation.

17 Claims, 4 Drawing Sheets

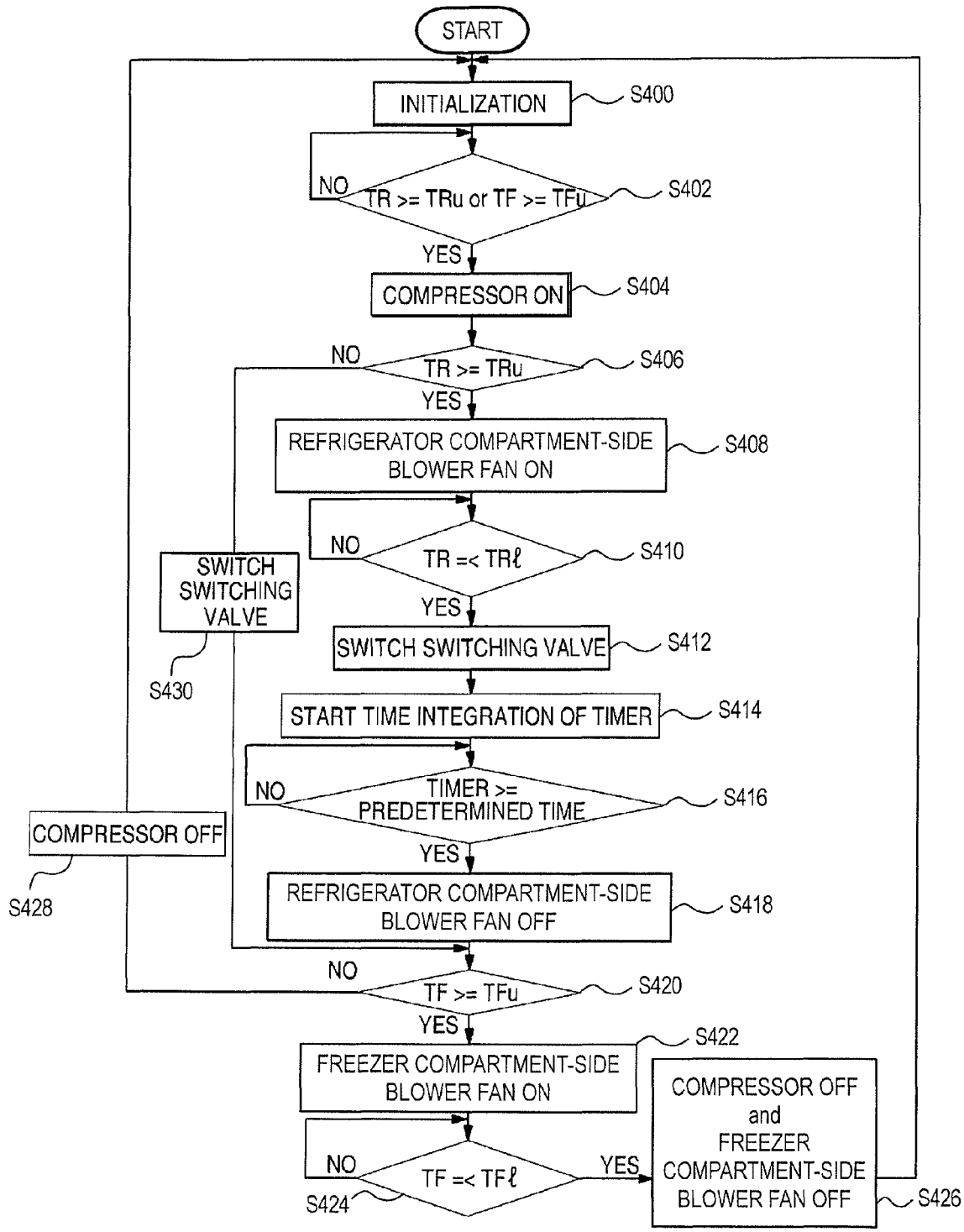

ate the present application is herein filed by the applicant with the information of the United States Patent and Trademark Office.

REFRIGERATOR AND METHOD FOR CONTROLLING A REFRIGERATOR

CROSS-REFERENCE TO RELATED APPLICATION(S)

The present application claims priority under 35 U.S.C. 119 and 35 U.S.C. 365 to Korean Patent Application No. 10-2013-0157646, filed in Korea on Dec. 17, 2013, which is hereby incorporated by reference in its entirety.

BACKGROUND

1. Field

A refrigerator and a method for controlling a refrigerator are disclosed herein.

2. Background

In general, refrigerators are home appliances that store food or other items at a low temperature in an internal storage space shielded by a door. For this, refrigerators are configured to optimally store food by cooling a storage space using cool air generated through heat exchange with refrigerant circulating in a refrigeration cycle.

In general, an inner space of a refrigerator is partitioned into a refrigerator compartment and a freezer compartment, which are cooled by supplying cool air generated in an evaporator of a refrigeration cycle. For this, a blower fan to blow cool air and a damper to selectively switch a flow direction of the air to the refrigerator compartment or the freezer compartment are provided.

In the refrigerator with the aforementioned structure, an internal temperature of the refrigerator may be maintained at a predetermined temperature in such a way that, when the temperature of the refrigerator compartment does not meet a desired temperature, the damper is switched to supply cool air into the refrigerator compartment, thereby cooling the refrigerator compartment. Also, when the temperature of the freezer compartment does not meet a desired temperature, a compressor is activated, and the damper switched to supply cool air to the freezer compartment, thereby cooling the freezer compartment.

However, in the refrigerator with the aforementioned structure, the compressor is activated according to the temperature of the freezer compartment, and the cool air is produced by one evaporator. Thus, when the temperature of the freezer compartment does meet the desired condition while the temperature of the refrigerator compartment does not meet the desired condition, the compressor does not operate, and thus, the refrigerator compartment is not cooled. In this state, when the temperature of the refrigerator compartment rises too high, refrigerating performance may deteriorate, and also, when the compressor operates according to the rise in temperature, it may take a longer time to lower the temperature of the refrigerator compartment to a preset or predetermined temperature, thereby deteriorating cooling efficiency.

To solve the above-mentioned limitations, Korean Patent Publication No. 10-2000-0028571, which is hereby incorporated by reference, discloses a refrigerator that includes a pair of coolers, respectively, that cool a refrigerator compartment and a freezer compartment, and a switching valve that switches a flow direction of a refrigerant supplied from a compressor to efficiently cool an inside of the refrigerant, so that the inside of the refrigerator is effectively cooled by allowing the switching valve to switch the flow direction of the refrigerant according to temperatures of the refrigerator compartment and the freezer compartment. In detail, in the refrigerator described above, when an internal temperature of the refrigerator compartment or the freezer compartment during a refrigeration operation is lowered to a preset or predetermined lower limit temperature, operation of the compressor stops in a case in which the internal temperature of the refrigerator compartment or the freezer compartment which does not perform the refrigeration operation is lower than a preset or predetermined upper limit temperature. In addition, when the compressor stops, the internal temperature of the refrigerator compartment or the freezer compartment which does not perform the refrigeration operation is sufficiently lowered. Therefore, it is possible to prevent the internal temperature of the refrigerator compartment or the freezer compartment which does not perform the refrigeration operation from significantly rising too much when the compressor is restarted, thereby improving operating efficiency of the compressor.

However, in order to simultaneously cool the refrigerator compartment and the freezer compartment in the refrigerator described above, the refrigerator operates in a serial cycle to allow the refrigerant to flow through both of the pair of evaporators. However, when only the freezer compartment does not meet a desired temperature, the refrigerant may be bypassed to flow into the freezer compartment-side evaporator by the switching valve. While the refrigerant flows into the freezer compartment-side and refrigerator compartment-side evaporator, which are serially connected to each other, a large amount of refrigerant remains in the refrigerator compartment-side evaporator and a flow path connected to the refrigerator compartment-side evaporator at an instant that the refrigerant is bypassed to flow to the freezer compartment-side evaporator by the switching valve. If the refrigerant does not quickly return into the main cycle, an overheating phenomenon occurs due to a shortage of the refrigerant in the freezer compartment-side evaporator.

BRIEF DESCRIPTION OF THE DRAWINGS

Embodiments will be described in detail with reference to the following drawings in which like reference numerals refer to like elements, and wherein:

FIG. 4 is a flowchart of a method for controlling a refrigerator.

DETAILED DESCRIPTION

Figure 1:
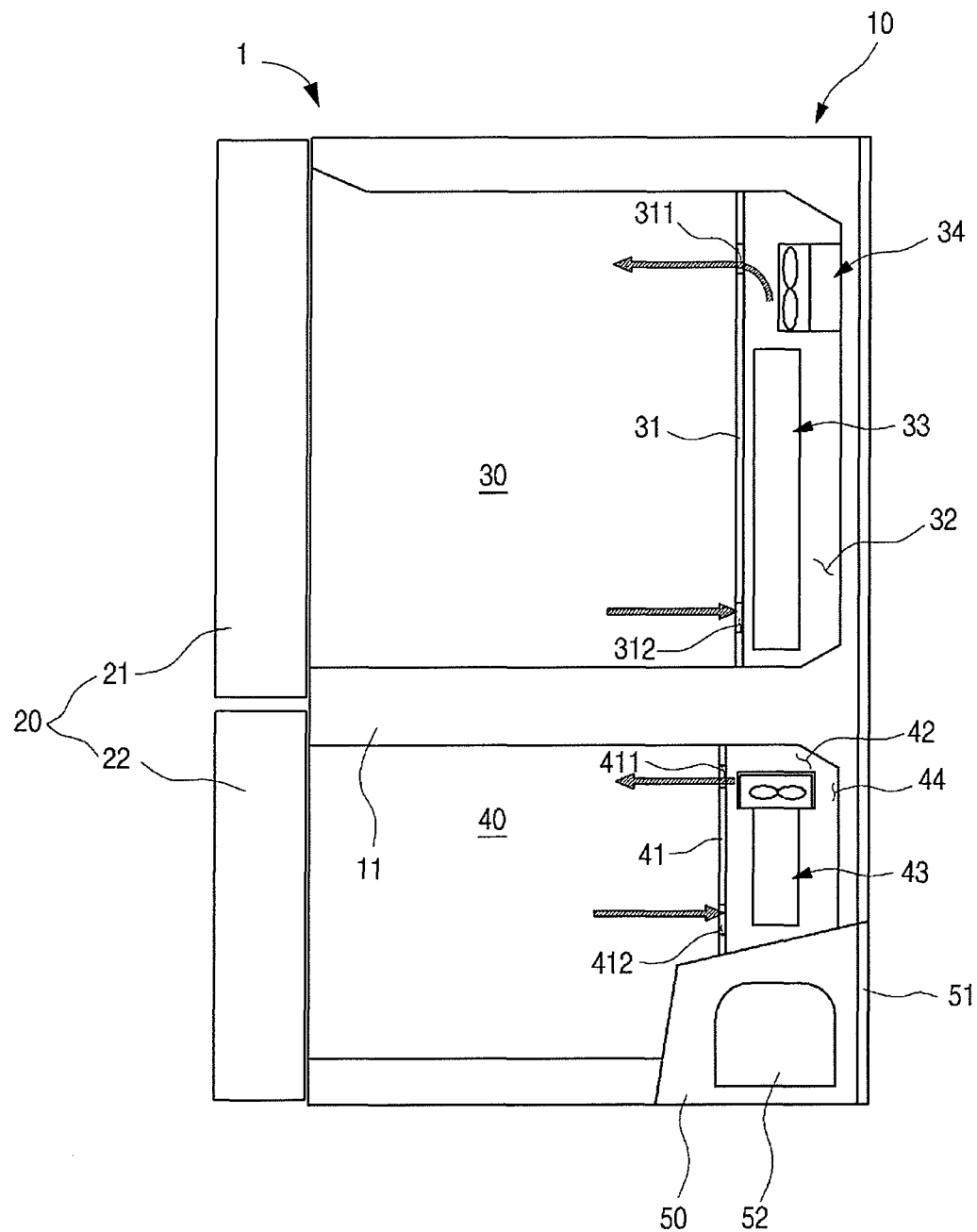
FIG. 1 is a schematic diagram of a refrigerator according to an embodiment.

Reference will now be made in detail to embodiments, examples of which are illustrated in the accompanying drawings. Where possible, like reference numerals have been used to indicate like elements, and repetitive disclosure has been omitted.

In the following detailed description of embodiments, reference is made to the accompanying drawings that form a part hereof, and in which is shown by way of illustration specific embodiments which may be practiced. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense.

Figure 2:
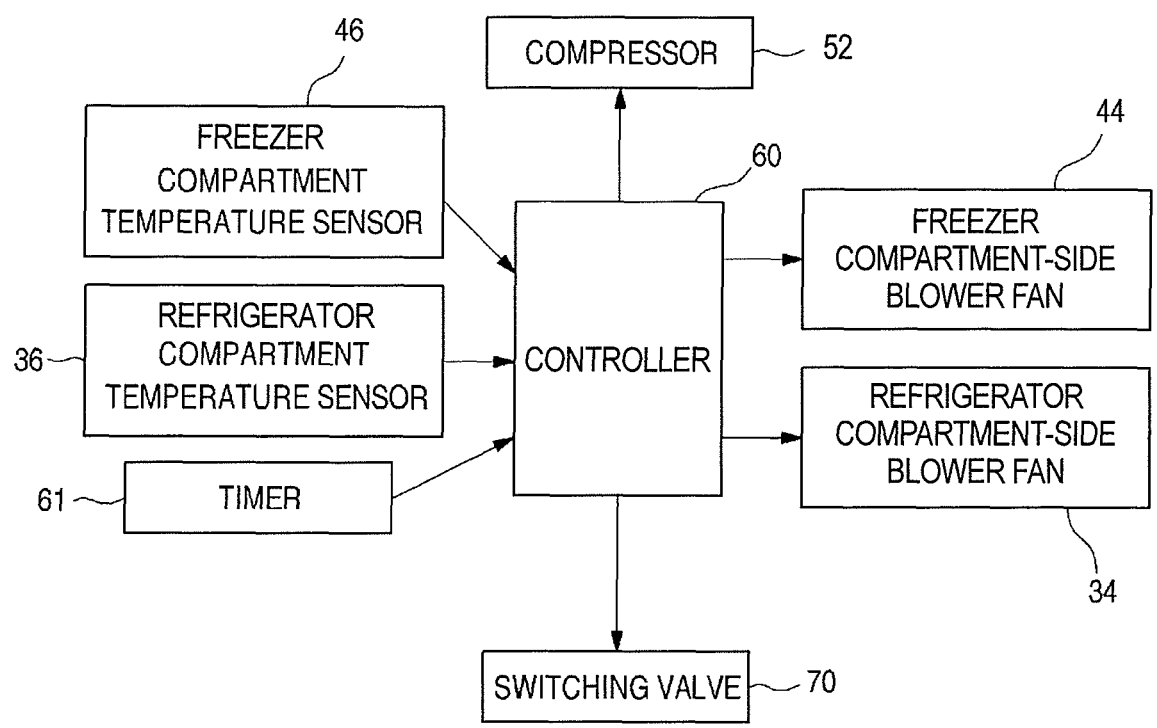
FIG. 2 is a block diagram illustrating electrical components of the refrigerator of FIG. 1.

FIG. 1 is a schematic diagram of a refrigerator according to an embodiment. FIG. 2 is a block diagram illustrating electrical components of the refrigerator of FIG. 1.

Referring to FIGS. 1 and 2, a refrigerator 1 according to an embodiment may include a refrigerator body 10 that defines a storage space, and a door 20 mounted on the refrigerator body 10 to open and close the storage space. An overall exterior of the refrigerator 1 may be defined by the refrigerator body 10 and the door 20.

The storage space may be partitioned by a barrier 11. A refrigerator compartment 30 may be defined in an upper portion, and a freezer compartment 40 may be defined in a lower portion. The door 20 may include a refrigerator compartment door 21 to independently open and close the refrigerator compartment 30, and a freezer compartment door 22 to independently open and close the freezer compartment 40. The refrigerator compartment door 21 and the freezer compartment door 22 may be rotatably mounted on the body 10, or slidably withdrawably mounted on the body 10 to open and close the refrigerator compartment 30 and the freezer compartment 40, respectively.

A machine room 50 may be defined in a lower portion of the body 10. The machine room 50 may be a space partitioned from the storage space by an insulating material. The machine room 50 may be defined in a bottom surface of the body 10. The machine room 50 may be opened at a rear side thereof, and the opened rear side of the machine room 50 may be covered by a machine room grille 51. The machine room grille 51 may have a plurality of vent holes (not shown) so that external air may flow to inside or outside of the machine room 50.

A compressor 52 and condenser 53, which constitute a refrigeration cycle, and a cooling fan (not shown) to accelerate heat exchange of the condenser 53 may be provided in the machine room 50. Also, if necessary, at least one of a refrigerator compartment-side capillary tube 35 or a freezer compartment-side capillary tube 45, which may be, respectively, connected to the refrigerator compartment-side evaporator 33 and the freezer compartment-side evaporator 43, may be provided in the machine room 50. In addition, a switching valve 70 disposed in a refrigerant flow path connected to the refrigerator compartment-side capillary tube 35 and the freezer compartment-side capillary tube 45 to switch a flow direction of the refrigerant may be provided in the machine room 50.

The refrigerator compartment-side capillary tube 35, the freezer compartment-side capillary tube 45, and the switching valve 70 may be disposed at positions different from the machine room 50. However, embodiments are not limited to positions of these components.

Evaporators to generate cool air to cool an inside of the refrigerator may be disposed at a rear side of the storage space. The evaporators may be disposed at rear sides of the refrigerator compartment 30 and the freezer compartment 40, respectively. The evaporators may include a refrigerator compartment-side evaporator 33 and a freezer compartment-side evaporator 43 to independently cool the refrigerator compartment 30 and the freezer compartment 40.

In detail, a refrigerator compartment grille 31 may be disposed at a rear surface of the refrigerator compartment 30. The refrigerator compartment grille 31 may partition a space of the refrigerator compartment 30 to store food or other items from a refrigerator compartment-side heat-exchange chamber 32, in which the refrigerator compartment-side evaporator 33 may be accommodated. The refrigerator compartment grille 31 may include a discharge hole 311, through which the cool air generated in the refrigerator compartment-side evaporator 33 may be supplied into the refrigerator compartment, and a suction hole 312, through which the air within the refrigerator compartment may be suctioned to be heat-exchanged with the refrigerator compartment-side evaporator 33.

Also, the refrigerator compartment-side evaporator 33 may be disposed in the refrigerator compartment-side heat-exchange chamber 32, and the cool air to cool an inside of the refrigerator compartment 30 may be generated by the refrigerator compartment-side evaporator 33. A refrigerator compartment-side blower fan 34 may be disposed in the refrigerator compartment-side heat-exchange chamber 32. The refrigerator compartment-side blower fan 34 may forcibly blow the cool air generated by the refrigerator compartment-side evaporator 33 to the refrigerator compartment 30 to cool the inside of the refrigerator compartment 30. Then, the air of the refrigerator compartment 30 may be suctioned into the refrigerator compartment-side heat-exchange chamber 32, and then, may be heat-exchanged with the refrigerator compartment-side evaporator 33.

The refrigerator compartment-side blower fan 34 may employ either an axial flow fan to axially discharge air in air suction and discharge directions, or a centrifugal fan to discharge air in a circumferential direction. The refrigerator compartment-side blower fan 34 may further include a separate air guide to allow air to be smoothly supplied into the refrigerator compartment 30. Also, the refrigerator compartment-side blower fan 34 may be fixed to the inside of the refrigerator compartment-side heat-exchange chamber 32 using a separate frame.

A refrigerator compartment temperature sensor 36 to measure an internal temperature of the refrigerator compartment 30 may be disposed in the refrigerator compartment 30. A controller 60 may control operations of the compressor 52, the refrigerator compartment-side blower fan 34, and a freezer compartment-side blower fan 44 according to the temperature measured by the refrigerator compartment temperature sensor 36.

A freezer compartment grille 41 may be disposed at a rear surface of the freezer compartment 40. The freezer compartment grille 41 may partition a space of the freezer compartment 40 to store food or other items from the freezer compartment-side heat-exchange chamber 42, in which the freezer compartment-side evaporator 43 may be accommodated. The freezer compartment grille 41 may have a discharge hole 411, through which the cool air generated in the freezer compartment-side evaporator 43 may be supplied into the freezer compartment 40, and a suction hole 412 that suctions air into the freezer compartment 40 to be heat-exchanged with the freezer compartment-side evaporator 33.

The freezer compartment-side evaporator 43 may be disposed in the freezer compartment-side heat-exchange chamber 42 to generate the cool air to cool an inside of the freezer compartment 40. Further, the freezer compartment-side blower fan 44 may be disposed in the freezer compartment-side heat-exchange chamber 42. The freezer compartment-side blower fan 44 may forcibly blow the cool air generated by the freezer compartment-side evaporator 43 to the freezer compartment 40, thereby cooling the freezer compartment 40 and suctions the air in the freezer compartment 40 into the freezer compartment-side heat-exchange chamber 42 to heat-exchange the air with the freezer compartment-side evaporator 43.

The freezer compartment-side blower fan 44 may also employ either an axial flow fan or a centrifugal fan. A separate air guide or a frame to mount the freezer compartment-side blower fan 44 may be disposed in the freezer compartment-side heat exchange chamber 42. A freezer compartment temperature sensor 46 to measure an internal temperature of the freezer compartment 40 may be disposed in the freezer compartment 40

The controller 60 may include a timer 61 to measure an operation time of each of the components in addition to the refrigerator compartment-side blower fan 34.

Hereinafter, a flow path structure and refrigerant flow of the refrigerator according to an embodiment will be described.

Figure 3:
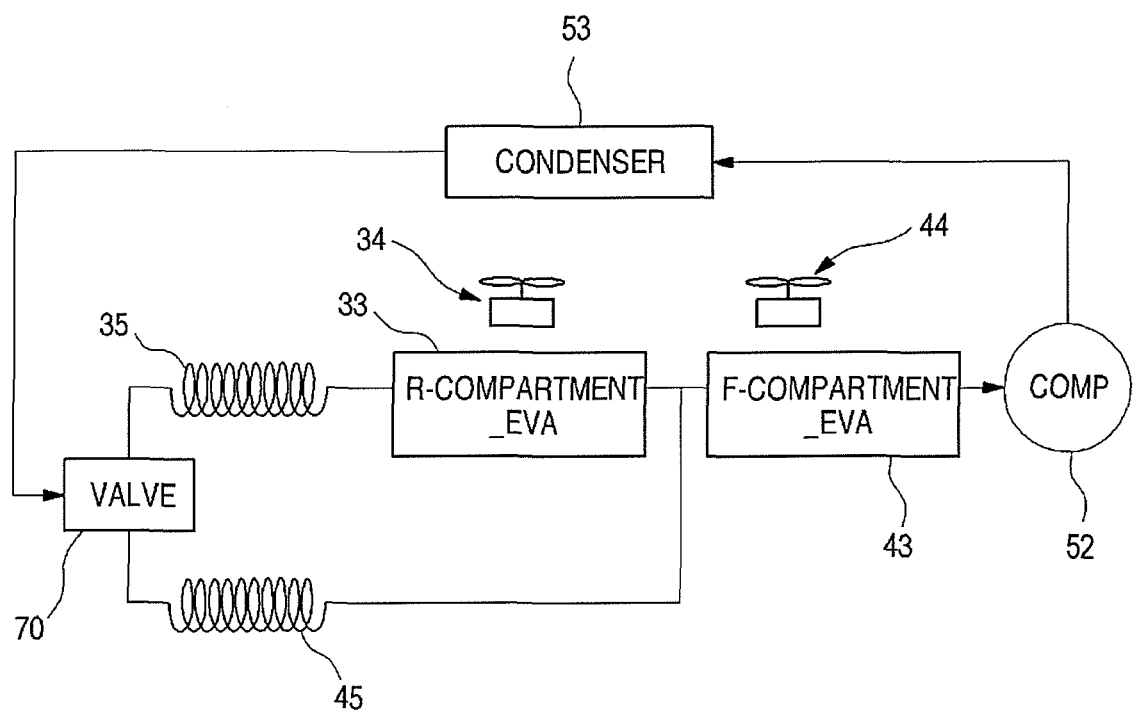
FIG. 3 is a circuit diagram illustrating a refrigerant flow in the refrigerator of FIG. 1.

FIG. 3 is a circuit diagram illustrating a refrigerant flow in the refrigerator of FIG. 1. As illustrated in FIG. 3, all of the compressor 52, the condenser 53, the refrigerator compartment-side evaporator 33, the freezer compartment-side evaporator 43, the refrigerator compartment-side capillary tube 35, and the freezer compartment-side capillary tube 45 may be connected by refrigerant piping to form a flow path, and thus, form an overall refrigeration cycle so that refrigerant may circulate. The switching valve 70 may be disposed in the refrigerant piping to control a flow of the refrigerant so that the refrigerant passes through all of the refrigerator compartment-side evaporator 33 and the freezer compartment-side evaporator 43, or passes through only the freezer compartment-side evaporator 43.

In detail, an outlet of the compressor 52 and an inlet of the condenser 53 may be coupled to each other by the refrigerant piping. The refrigerant piping coupled to the outlet of the condenser 53 may be branched into the refrigerator compartment-side evaporator 33 and the freezer compartment-side evaporator 43. The refrigerant piping may be branched by the switching valve 70 The switching valve 70 may be provided as a three-way valve so that each of an outlet of the condenser 53, inlets of the refrigerator compartment-side capillary tube 35, and the freezer compartment-side capillary tube 45 may be connected to the three-way valve.

That is, according to operation of the switching valve 70, the refrigerant flowing into the switching valve 70 may selectively flow towards the refrigerator compartment-side capillary tube 35 or the freezer compartment-side capillary tube 45. Also, the refrigerator compartment-side capillary tube 35 and the freezer compartment-side capillary tube 45 may be connected to the outlet of the switching valve 70 and the inlets of the refrigerator compartment-side evaporator 33 and the freezer compartment-side evaporator 43, respectively.

The refrigerator compartment-side evaporator 33 and the freezer compartment-side evaporator 43 may be serially connected to each other by the refrigerant piping. The outlet of the freezer compartment-side evaporator 43 may be connected to the inlet of the compressor 52. Also, the freezer compartment-side capillary tube 45 may be connected to the refrigerant piping connecting the freezer compartment-side evaporator 43 to the freezer compartment-side evaporator 33.

Thus, according to the switching of the switching valve 70, the refrigerant passing through the refrigerator compartment-side capillary tube 35 and the refrigerator compartment-side evaporator 33 may pass through the freezer compartment-side evaporator 43 to return to the compressor 52, and the refrigerant passing through the freezer compartment-side capillary tube 45 and the freezer compartment-side evaporator 43 may pass through only the freezer compartment-side evaporator 43 without passing through the refrigerator compartment-side evaporator 33 to return to the compressor 52.

The operation of the switching valve 70 may be determined by the controller 60. The controller 60 may decide whether the temperatures measured in the refrigerator compartment 30 and the freezer compartment 40 are within a preset or predetermined temperature range to determine an operation of the switching valve 70.

Hereinafter, an operation of a refrigerator with the above-mentioned structure according to an embodiment will be described in more detail.

FIG. 4 is a flowchart of a method for controlling a refrigerator. As illustrated in FIG. 4, refrigerator 1 according to an embodiment may firstly be initialized when an operation thereof starts, in step S400. During initialization, an integral time of timer 61, and temperature sensors 36 and 46, for example, may be initialized.

After initialization, temperatures of refrigerator compartment 30 and freezer compartment 40 may be measured by the refrigerator compartment temperature sensor 36 and the freezer compartment temperature sensor 46, respectively. Until temperatures TR and TF of the refrigerator compartment 30 and the freezer compartment 40 reach or exceed a preset or predetermined upper limit temperature TRu and TFu, the temperatures of the refrigerator compartment 30 and the freezer compartment 40 may be measured, in step S402. When the temperature TR or TF of the refrigerator compartment 30 or the freezer compartment 40 exceeds the upper limit temperature, the controller 60 may start an operation of the compressor 52, in step S404.

The refrigerant compressed by the operation of compressor 52 may pass through the refrigerator compartment-side capillary tube 35, the refrigerator compartment-side evaporator 33, and freezer compartment-side evaporator 43 via the condenser 53 and the switching valve 70 to return to the compressor 52, thereby circulating into a refrigeration cycle. Cool air maybe generated in the refrigerator compartment-side evaporator 33 and the freezer compartment-side evaporator 43. A flow path may be selectively opened according to each state by operation of the switching valve 70.

When the temperature TR of the refrigerator compartment 30 is above the preset or predetermined upper limit temperature TRu, refrigerator compartment-side blower fan 34 may operate to cool the inside of the refrigerator compartment 30. When the temperature TF of the freezer compartment 40 is above the preset or predetermined upper limit temperature TFu, freezer compartment-side blower fan 44 may operate to cool the inside of the freezer compartment 40.

When the temperature TR of the refrigerator compartment 30 is above the preset or predetermined upper limit temperature TRu, in step S406, the flow path towards the refrigerator compartment-side capillary tube 35 and the refrigerator compartment-side evaporator 33 may be opened by the switching valve 70, and simultaneously, the refrigerator compartment-side blowing fan 34 may operate to cool the inside of the refrigerator compartment 30, in step S408.

When the refrigerator compartment 30 has a temperature less than a preset or predetermined lower limit temperature TRl due to the above-mentioned continuous cooling of the refrigerator compartment 30, in step S410, the switching valve 70 may be switched to close the flow path towards the refrigerator compartment-side capillary tube 35 and the refrigerator compartment-side evaporator 33, in step S412.

The timer 61 may start time integration, in step S414. The refrigerator compartment-side blower fan 34 may be maintained in a continuous operation state, and the timer 61 may count an operating time of the refrigerator compartment-side blower fan 34 after the switching of the switching valve 70. The refrigerator compartment-side blower fan 34 may continuously operate until the time counted by the timer 61 reaches a preset or predetermined time, in step S416. When the refrigerator compartment-side blower fan 34 operates in the state in which the flow path is switched by the switching valve 70, the refrigerator compartment-side evaporator 33 may rise in temperature because the refrigerant is not continuously supplied, and thus, the refrigerant within the refrigerator compartment-side evaporator 33 may be quickly vaporized.

That is, heat-exchange of the refrigerant remaining in the refrigerator compartment-side evaporator 33 may be accelerated by operation of the refrigerator compartment-side blower fan 34, and the refrigerant more quickly vaporized may flow into the refrigerator compartment-side evaporator 33. The refrigerator compartment-side blower fan 34 may be stopped after operating for the preset or predetermined time, in step S418. The operation time of the refrigerator compartment-side blower fan 34 may be set to a time period during which the refrigerant remaining in the refrigerator compartment-side evaporator 33 may be sufficiently vaporized to return according to a capacity of the refrigerator compartment-side evaporator 33. When the time counted by the timer 61 reaches the preset or predetermined time, the refrigerator compartment-side blowing fan 34 may stop.

When the refrigerator compartment-side blower fan 34 stops, a temperature of the freezer compartment 40 may be detected. When the temperature TF of the freezer compartment 40 is lower than the preset or predetermined upper limit temperature TFu, the state of the timer 61 may be initialized, in step S420, and the compressor 52 may be maintained in an off-state, in step S428. When the temperature TF of the freezer compartment 40 is higher than the preset or predetermined upper limit temperature TFu, in step S420, operation of the refrigerator compartment-side blower fan 34 may start to cool an inner space of the freezer compartment 40 by the cool air generated by the freezer compartment-side evaporator 43. The refrigerant discharged from the condenser 53 may pass through the switching valve 70 and may be bypassed towards the freezer compartment-side evaporator 43 is blocked while a flow of the refrigerant into the refrigerator compartment-side evaporator 33 is blocked. In this state, the freezer compartment-side blower fan 44 may operate, in step S422 until the internal temperature of the freezer compartment 40 reaches the preset or predetermined lower limit temperature TFl. When the internal temperature of the freezer compartment 40 is below the preset or predetermined lower limit temperature TFl, in step S424, the compressor 52 and the freezer compartment-side blower fan 44 may be turned off to become in the initialized states, in step S426.

According to the refrigerator and the method for controlling a refrigerator according to embodiments disclosed herein, refrigerant in the refrigerator compartment-side evaporator may be quickly vaporized by operation of the refrigerator compartment-side blower fan, even after a temperature of the refrigerator compartment reaches a preset or predetermined temperature to complete a cooling operation. Thus, the refrigerant may more quickly return to the freezer compartment-side evaporator. Therefore, remaining refrigerant may quickly return when the flow path is switched to prevent refrigerant shortage in the freezer compartment-side evaporator from occurring, thereby realizing efficient cycle operation.

Embodiments disclosed herein provide a refrigerator that may include a pair of evaporators so that, when a switching valve operates, an operation of a one-side blower fan may be maintained for a predetermined period of time to more quickly collect refrigerant, thereby improving cycle operation efficiency, and a method of controlling a refrigerator.

Embodiments disclosed herein provide a refrigerator that may include a body, in which a compressor and a condenser may be disposed, the body having a refrigerator compartment and a freezer compartment; a refrigerator compartment-side evaporator disposed in the refrigerator compartment to cool the refrigerator compartment; a refrigerator compartment-side blower fan to forcibly blow air to heat-exchange the refrigerator compartment-side evaporator with air within the refrigerator compartment; a refrigerator compartment temperature sensor disposed in the refrigerator compartment to measure an internal temperature of the refrigerator compartment; a freezer compartment-side evaporator disposed in the freezer compartment to cool the freezer compartment; a freezer compartment-side blower fan to forcibly blow air to heat-exchange the freezer compartment-side evaporator with air within the freezer compartment; a freezer compartment temperature sensor disposed in the freezer compartment to measure an internal temperature of the freezer compartment; a switching valve that communicates with an outlet of the condenser, the switching valve being branched into the refrigerator compartment-side evaporator and the freezer compartment-side evaporator to selectively supply the refrigerant into an inlet of the refrigerator compartment-side evaporator or the freezer compartment-side evaporator according to temperatures of the refrigerator compartment and the freezer compartment; and a control unit or controller connected to the refrigerator compartment temperature sensor, the freezer compartment temperature sensor, the switching valve, the refrigerator compartment-side blowing fan, and the freezer compartment-side blower fan to control an operation of each of the refrigerator compartment temperature sensor, the freezer compartment temperature sensor, the switching valve, the refrigerator compartment-side blower fan, and the freezer compartment-side blower fan. Operation of the refrigerator compartment-side blower fan may stop after the refrigerator compartment-side blowing fan additionally operates for a predetermined period of time when the switching valve is switched from a state in which the refrigerant is supplied into the freezer compartment-side evaporator from a state in which the refrigerant is supplied into the refrigerator compartment-side evaporator.

The refrigerator may further include a timer connected to the control unit to count an operation time of the refrigerator compartment-side blower fan. The refrigerator compartment-side evaporator and the freezer compartment-side evaporator may be serially connected to each other.

A refrigerator compartment-side capillary tube and a freezer compartment-side capillary tube, which may be connected to the switching valve, may be disposed in inlets of the refrigerator compartment-side evaporator and the freezer compartment-side evaporator, respectively. Operation of the freezer compartment-side blower fan may start after operation of the refrigerator compartment-side blower fan stops.

Embodiments disclosed herein provide a method for controlling a refrigerator in which a refrigerator compartment-side evaporator and a freezer compartment-side evaporator are serially connected to each other so that a refrigerant may selectively supplied into the refrigerator compartment-side evaporator and the freezer compartment-side evaporator by a switching valve. The method may include switching the switching valve to additionally operate for a preset or predetermined time so that the refrigerant of the refrigerator compartment-side evaporator may be evaporated to more quickly return to the freezer compartment-side evaporator, when a state in which the refrigerant flows into the refrigerator compartment-side evaporator is switched into a state in which the refrigerant flows into the freezer compartment-side evaporator.

When the switching valve is switched into a state in which the refrigerant flows into the freezer compartment-side evaporator from a state in which the refrigerant flows into the refrigerator compartment-side evaporator, operation of the freezer compartment-side blower fan may start after a preset or predetermined time has elapse. The refrigerator compartment-side evaporator and the freezer compartment-side evaporator may be serially connected to each other, and the switching valve may communicate with an inlet of each of the refrigerator compartment-side evaporator and the freezer compartment-side evaporator.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
   a body in which a compressor and a condenser are disposed, the body having a refrigerator compartment and a freezer compartment;
   a refrigerator compartment-side evaporator disposed in the refrigerator compartment to cool the refrigerator compartment;
   a refrigerator compartment-side blower fan to forcibly blow air to heat-exchange the refrigerator compartment-side evaporator with air within the refrigerator compartment;
   a refrigerator compartment temperature sensor disposed in the refrigerator compartment to measure an internal temperature of the refrigerator compartment;
   a freezer compartment-side evaporator disposed in the freezer compartment to cool the freezer compartment;
   a freezer compartment-side blower fan to forcibly blow air to heat-exchange the freezer compartment-side evaporator with air within the freezer compartment;
   a freezer compartment temperature sensor disposed in the freezer compartment to measure an internal temperature of the freezer compartment;
   a switching valve that communicates with an outlet of the condenser, the switching valve being branched into the refrigerator compartment-side evaporator and the freezer compartment-side evaporator to selectively supply the refrigerant into an inlet of the refrigerator compartment-side evaporator or an inlet of the freezer compartment-side evaporator according to temperatures of the refrigerator compartment and the freezer compartment; and
   a controller connected to the refrigerator compartment temperature sensor, the freezer compartment temperature sensor, the switching valve, the refrigerator compartment-side blower fan, and the freezer compartment-side blower fan to control an operation of each of the refrigerator compartment temperature sensor, the freezer compartment temperature sensor, the switching valve, the refrigerator compartment-side blower fan, and the freezer compartment-side blower fan, wherein the operation of the refrigerator compartment-side blower fan stops after the refrigerator compartment-side blower fan additionally operates for a predetermined period of time when the switching valve is switched from a state in which the refrigerant is supplied into the refrigerator compartment-side evaporator to a state in which the refrigerant is supplied into the freezer compartment-side evaporator and while the refrigerant flows into the freezer compartment-side evaporator, so that the refrigerant in the refrigerator compartment-side evaporator is evaporated and more quickly returns to the freezer compartment-side evaporator.

2. The refrigerator according to claim 1, further comprising a timer connected to the controller to count an operation time of the refrigerator compartment-side blower fan.

3. The refrigerator according to claim 1, wherein the refrigerator compartment-side evaporator and the freezer compartment-side evaporator are serially connected to each other.

4. The refrigerator according to claim 1, wherein a refrigerator compartment-side capillary tube and a freezer compartment-side capillary tube, which are connected to the switching valve, are disposed in the inlets of the refrigerator compartment-side evaporator and the freezer compartment-side evaporator, respectively.

5. The refrigerator according to claim 1, wherein the operation of the freezer compartment-side blower fan starts after the operation of the refrigerator compartment-side blower fan stops.

6. A method for controlling a refrigerator in which a refrigerator compartment-side evaporator and a freezer compartment-side evaporator are serially connected to each other so that a refrigerant is selectively supplied into the refrigerator compartment-side evaporator and the freezer compartment-side evaporator by a switching valve, the method comprising:
   operating a refrigerator compartment-side blower fan to additionally operate for a predetermined period of time so that the refrigerant in the refrigerator compartment-side evaporator is evaporated and more quickly returns to the freezer compartment-side evaporator when the switching valve is switched from a state in which the refrigerant flows into the refrigerator compartment-side evaporator to a state in which the refrigerant flows into the freezer compartment-side evaporator and while the refrigerant flows into the freezer compartment-side evaporator.

7. The method according to claim 6, further comprising, when the switching valve is switched into the state in which the refrigerant flows into the freezer compartment-side evaporator from the state in which the refrigerant flows into the refrigerator compartment-side evaporator, starting operation of a freezer compartment-side blower fan after a predetermined period of time has elapsed.

8. The method according to claim 6 wherein the switching valve communicates with an inlet of each of the refrigerator compartment-side evaporator and the freezer compartment-side evaporator.

9. A refrigerator system, comprising:
a compressor to compress a refrigerant;
a condenser to condense the compressed refrigerant received from the compressor;
a first compartment-side evaporator to cool a first compartment;
a first compartment-side blower fan to forcibly blow air to heat-exchange the first compartment-side evaporator with air;
a second compartment-side evaporator to cool a second compartment;
a second compartment-side blower fan to forcibly blow air to heat-exchange the second compartment-side evaporator with air;
a switching valve that communicates with an outlet of the condenser, an inlet of the first compartment-side evaporator, and an inlet the second compartment-side evaporator to selectively supply the refrigerant into the first compartment-side evaporator or the second compartment-side evaporator according to temperatures of the first compartment and the second compartment, wherein operation of the first compartment-side blower fan stops after the first compartment-side blower fan additionally operates for a predetermined period of time when the switching valve is switched from a state in which the refrigerant is supplied into the first compartment-side evaporator to a state in which the refrigerant is supplied into the second compartment-side evaporator and while the refrigerant flows into the second compartment-side evaporator, so that the refrigerant in the first compartment-side evaporator is evaporated and more quickly returns to the second compartment-side evaporator.

10. The refrigerator system according to claim 9, further comprising:
a first compartment temperature sensor to detect a temperature of the first compartment; and
a second compartment temperature sensor to detect a temperature of the second compartment.

11. The refrigerator system according to claim 10, further comprising:
a controller connected to the first compartment temperature sensor, the second compartment temperature sensor, the switching valve, the first compartment-side blower fan, and the second compartment-side blower fan to control an operation of each of the first compartment temperature sensor, the second compartment temperature sensor, the switching valve, the first compartment-side blower fan, and the second compartment-side blower fan.

12. The refrigerator system according to claim 11, further comprising a timer connected to the controller to count an operation time of the first compartment-side blower fan.

13. The refrigerator system according to claim 9, wherein the first compartment-side evaporator and the second compartment-side evaporator are serially connected to each other.

14. The refrigerator system according to claim 9, further comprising a first compartment-side capillary tube and a second compartment-side capillary tube connected to the switching valve and the inlets of the first compartment-side evaporator and the second compartment-side evaporator, respectively.

15. The refrigerator system according to claim 9, wherein operation of the second compartment-side blower fan starts after the operation of the first compartment-side blower fan stops.

16. A refrigerator comprising the refrigerator system of claim 9.

17. Apparatus for controlling a refrigerator in which a refrigerator compartment-side evaporator and a freezer compartment-side evaporator are serially connected to each other so that a refrigerant is selectively supplied into the refrigerator compartment-side evaporator and the freezer compartment-side evaporator by a switching valve, a method comprising:
means for operating a refrigerator compartment-side blower fan to additionally operate for a predetermined period of time so that the refrigerant in the refrigerator compartment-side evaporator is evaporated and more quickly returns to the freezer compartment-side evaporator when a state in which the refrigerant flows into the refrigerator compartment-side evaporator is switched by the switching valve to a state in which the refrigerant flows into the freezer compartment-side evaporator, and while the refrigerant flows into the freezer compartment-side evaporator.

* * * * *